[12] United States Patent
Shearer et al.

(10) Patent No.: US 7,499,452 B2
(45) Date of Patent: Mar. 3, 2009

(54) SELF-HEALING LINK SEQUENCE COUNTS WITHIN A CIRCULAR BUFFER

(75) Inventors: Robert A. Shearer, Rochester, MN (US); Martha E. Voytovich, Rochester, MN (US); Craig A. Wigglesworth, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 11/023,708

(22) Filed: Dec. 28, 2004

(65) Prior Publication Data

US 2006/0140188 A1 Jun. 29, 2006

(51) Int. Cl.
*H04L 12/56* (2006.01)
*G06F 13/00* (2006.01)

(52) U.S. Cl. .................... 370/394; 370/352; 370/397; 370/395.53; 370/395.71; 370/474; 710/20; 710/36; 710/40; 710/53; 710/56

(58) Field of Classification Search ................ 370/509, 370/390, 395.6, 466, 394, 352, 397, 395.53, 370/474; 710/20, 35, 40, 503, 56
See application file for complete search history.

(56) References Cited

U.S. PATENT DOCUMENTS

| | | | |
|---|---|---|---|
| 5,293,621 A | 3/1994 | White et al. | |
| 5,568,487 A * | 10/1996 | Sitbon et al. | 370/466 |
| 5,581,705 A | 12/1996 | Passint et al. | |
| 5,841,973 A | 11/1998 | Kessler et al. | |
| 6,124,868 A | 9/2000 | Asaro et al. | |
| 6,188,690 B1 * | 2/2001 | Holden et al. | 370/390 |
| 6,269,360 B1 | 7/2001 | Petersen et al. | |
| 6,363,438 B1 | 3/2002 | Williams et al. | |
| 6,449,699 B2 | 9/2002 | Franke et al. | |
| 6,480,511 B1 * | 11/2002 | Petty | 370/509 |
| 6,628,659 B1 * | 9/2003 | Park | 370/395.6 |
| 6,725,296 B2 | 4/2004 | Craddock et al. | |
| 6,748,479 B2 * | 6/2004 | Sano et al. | 710/316 |
| 6,760,791 B1 * | 7/2004 | Askar | 710/52 |
| 6,801,207 B1 | 10/2004 | Tischler et al. | |
| 6,801,208 B2 | 10/2004 | Keshava et al. | |
| 6,820,143 B2 | 11/2004 | Day et al. | |
| 6,820,174 B2 | 11/2004 | Vanderwiel | |
| 6,838,902 B1 * | 1/2005 | Elftmann et al. | 326/40 |
| 6,912,602 B2 * | 6/2005 | Sano et al. | 710/22 |
| 6,944,719 B2 * | 9/2005 | Rowlands et al. | 711/141 |
| 6,980,027 B2 * | 12/2005 | Elftmann et al. | 326/40 |
| 7,206,879 B2 * | 4/2007 | Sano et al. | 710/105 |
| 2004/0117592 A1 | 6/2004 | Day et al. | |
| 2004/0162946 A1 | 8/2004 | Day et al. | |
| 2004/0263519 A1 | 12/2004 | Andrews et al. | |
| 2006/0130107 A1 * | 6/2006 | Gonder et al. | 725/110 |
| 2006/0140122 A1 * | 6/2006 | Shearer et al. | 370/236 |

* cited by examiner

*Primary Examiner*—Edan Orgad
*Assistant Examiner*—Venkatesh Haliyur
(74) *Attorney, Agent, or Firm*—Patterson & Sheridan LLP

(57) ABSTRACT

Methods and apparatus that allow recovery in the event that sequence counts used on receive and transmit sides of a communications link become out of sync are provided. In response to receiving a packet with an expected sequence count from a receiving device, a transmitting device may adjust pointers into a transmit buffer allowing the transmitting device to begin transmitting packets with the sequence count expected by the receiving device.

4 Claims, 10 Drawing Sheets

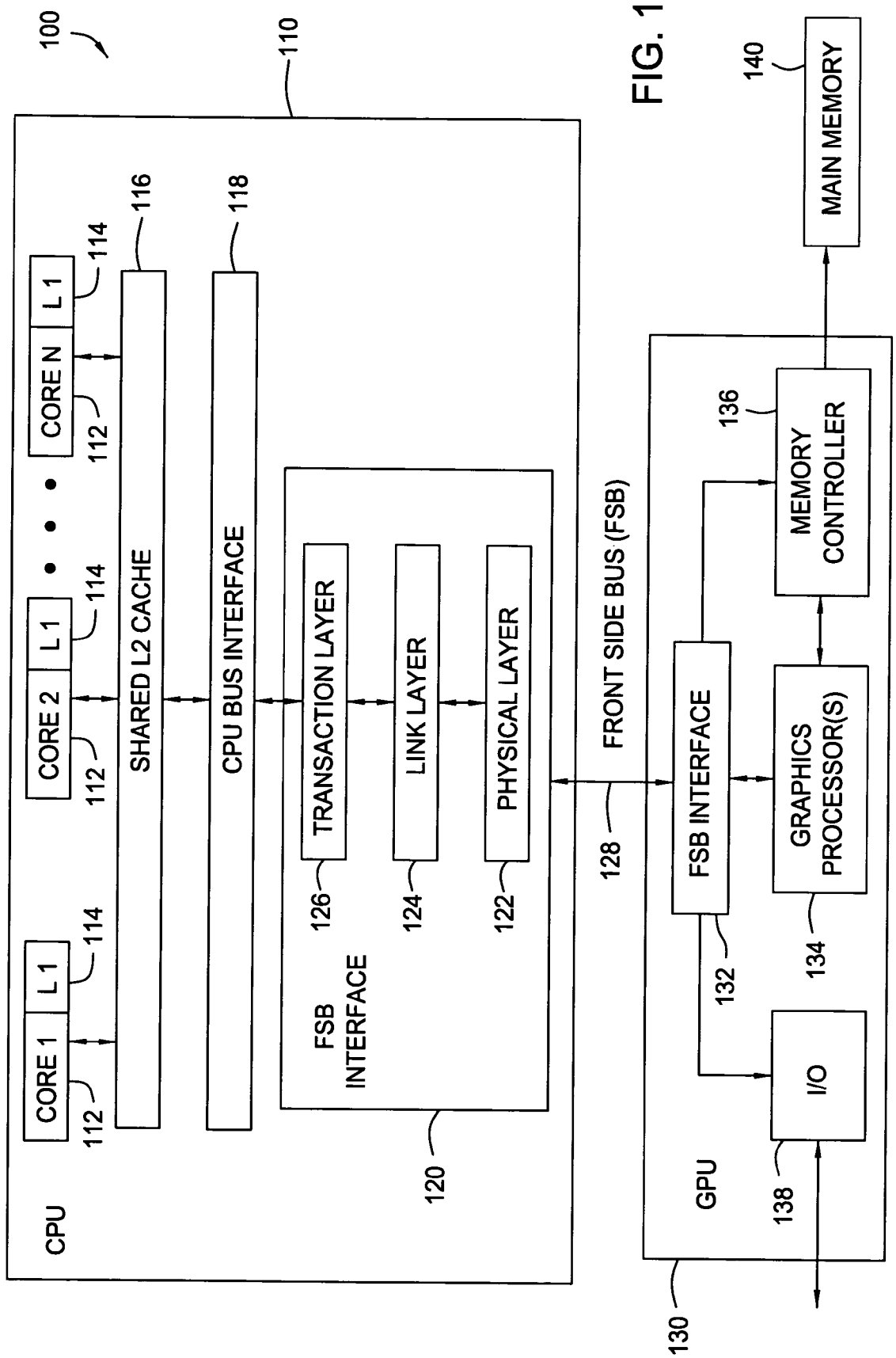

SELF-HEALING LINK SEQUENCE COUNTS WITHIN A CIRCULAR BUFFER

BACKGROUND OF THE INVENTION

1. Field of the Invention

The present invention generally relates to exchanging data on a bus between devices and, more particularly, to exchanging data between devices on a bus using a transmit buffer and assigned sequence counts.

2. Description of the Related Art

A system on a chip (SOC) generally includes one or more integrated processor cores, some type of embedded memory, such as a cache shared between the processors cores, and peripheral interfaces, such as external bus interfaces, on a single chip to form a complete (or nearly complete) system. Often SOCs communicate with other devices, such as a memory controller or graphics processing unit (GPU), by exchanging data packets over an external bus. Often, the devices will communicate over a single external bus utilizing multiple streams of data, commonly referred to as virtual channels.

According to some protocols, each data packet sent to an external device over a virtual channel is assigned a sequence count. The sequence count may be incremented for each packet, possibly rolling over to zero when a maximum sequence count is reached. Typically, the receiving device expects to receive packets with sequence counts in order and ignores packets having unexpected (out of order) sequence counts.

As a result, in such systems, there is a problem of how to recover if the two sides of the bus (receiving and transmitting devices) become out of sync as to what the next sequence count should be. This situation may arise, for example, if one of the devices is re-powered (or otherwise reset) causing their expected sequence count values to be reset. In some cases, the bus could become deadlocked because the transmitted sequence counts are not what the receive device is expecting.

As an example, a transmitting device (Chip A) may have successfully transmitted packets with sequence counts from 0 to 9 to a receiving device (Chip B). Chip B may then be reset due to some unexpected event, causing Chip B's expected sequence count to be reset to 0. Unfortunately, Chip A might only be able to send packets with sequence counts starting at 10 (having already sent packets 0-9). In this example, Chip B might never accept any more packets from Chip A, resulting in a bus deadlock.

Accordingly, what is needed is methods and systems to overcome or avoid this bus deadlock situation when transmitting and receiving device sequence counts get out of sync.

SUMMARY OF THE INVENTION

The present invention generally provides methods and systems that allow for recovery in the event that packet sequence counts on transmitting and receiving sides of a communication link become out of sync.

One embodiment provides a method of communicating with an external device over a bus utilizing one or more virtual channels, each utilizing a transmit buffer to hold packets to be sent to the external device. The method generally includes maintaining a current sequence count for packets to be transmitted to the external device, receiving a packet from the external device indicating an expected sequence count that does not match the current sequence count, and adjusting the current sequence count to match the expected sequence count by modifying one or more pointers into the transmit buffer.

Another embodiment provides an integrated circuit (IC) device generally including one or more processor cores, a bus interface for transferring data to and from an external device via an external bus, a transmit buffer for holding packets of data to be sent from the one or more processor cores to the external device over the external bus, and self-healing link logic circuitry. The self-healing link logic circuitry is generally configured to receive, from an external device, a packet containing an expected sequence count for packets transmitted to the external device by the IC device and, if a current sequence count maintained by the IC device does not match the expected sequence count, adjust the current sequence count to match the expected sequence count by modifying one or more pointers into the transmit buffer.

Another embodiment provides a system generally including a bus, one or more external devices, and a system on a chip (SOC). The SOC generally includes one or more processor cores, a transmit buffer for holding packets of data to be sent from the one or more processor cores to the external device over the bus, and self-healing link logic circuitry configured to receive, from an external device, a packet containing an expected sequence count for packets transmitted to the external device by the SOC and, if a current sequence count maintained by the SOC does not match the expected sequence count, adjust the current sequence count to match the expected sequence count by modifying one or more pointers into the transmit buffer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 illustrates an exemplary system including a central processing unit (CPU), in which embodiments of the present invention may be utilized.

DETAILED DESCRIPTION OF THE PREFERRED EMBODIMENTS

Figure 2A:
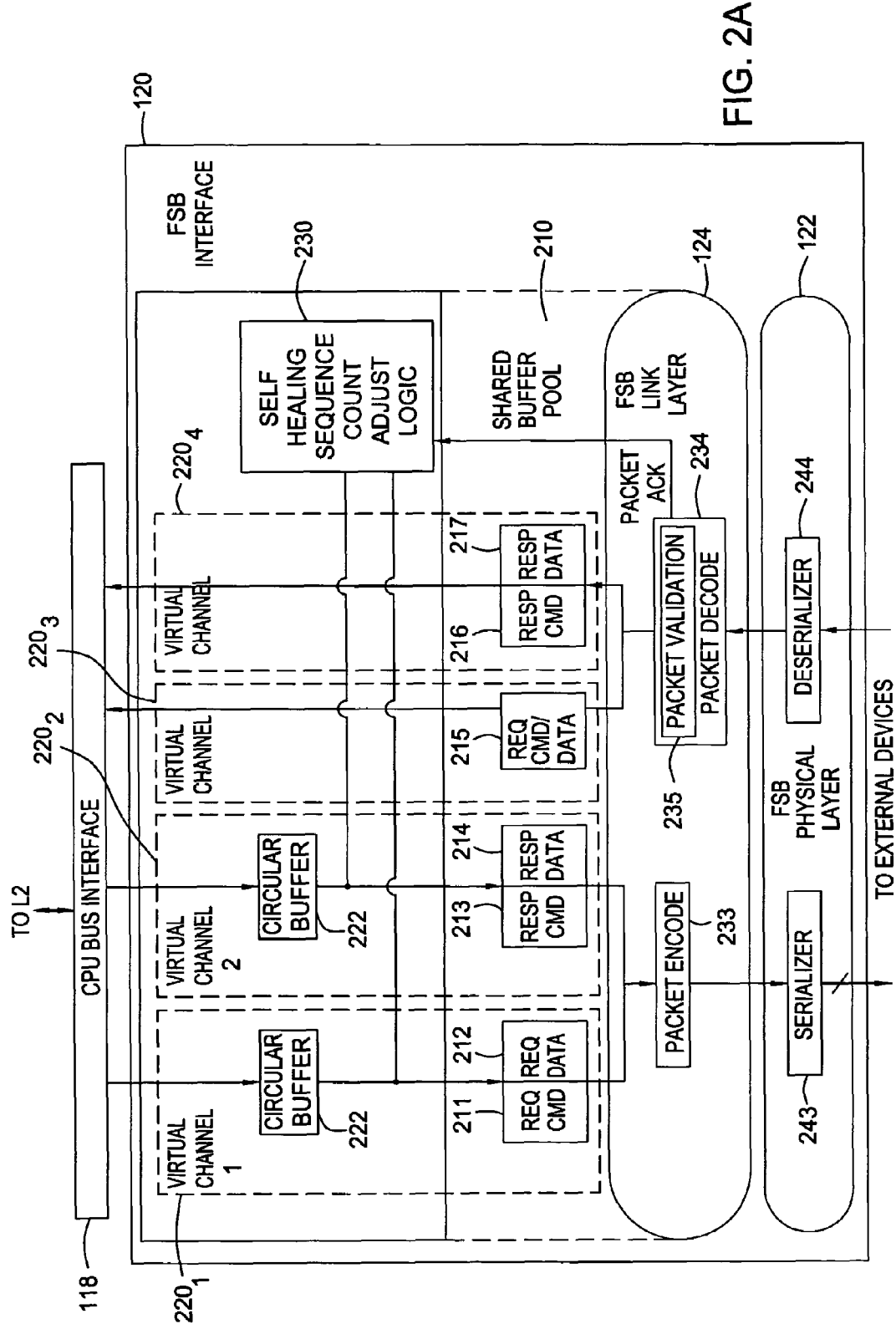
FIG. 2A is a block diagram of components of the CPU, according to one embodiment of the present invention.

Embodiments of the present invention generally allow a packet sequence count on a transmitting device to be adjusted to match the sequence count expected by a receiving device, for example, in the event the receiving device was reset for some possibly unexpected reason. By adjusting the sequence count maintained by the transmitting device, the transmitting device may resume sending packets starting with the expected sequence count, avoiding bus deadlocks.

As used herein, the term virtual channel generally refers to a stream of data from one component to another. Virtual channels may be implemented using various logic components (e.g., switches, multiplexors, etc.) utilized to route data, received over a common bus, from different sources to different destinations, in effect, as if there were separate physical channels between each source and destination.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

FIG. 1 illustrates an exemplary computer system 100 including a central processing unit (CPU) 110, in which embodiments of the present invention may be utilized. As illustrated, the CPU 110 may include one or more processor cores 112, which may each include any number of different type functional units including, but not limited to arithmetic logic units (ALUs), floating point units (FPUs), and single instruction multiple data (SIMD) units. Examples of CPUs utilizing multiple processor cores include the Power PC line of CPUs, available from IBM.

As illustrated, each processor core 112 may have access to its own primary (L1) cache 114, as well as a larger shared secondary (L2) cache 116. In general, copies of data utilized by the processor cores 112 may be stored locally in the L2 cache 116, preventing or reducing the number of relatively slower accesses to external main memory 140. Similarly, data utilized often by a processor core may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB) 128. The CPU 110 may include an FSB interface 120 to pass data between the external devices and the processing cores 112 (through the L2 cache) via the FSB 128. An FSB interface 132 on the GPU 130 may have similar components as the FSB interface 120, configured to exchange data with one or more graphics processors 134, input output (I/O) unit 138, and the memory controller 136 (illustratively shown as integrated with the GPU 130).

As illustrated, the FSB interface 120 may include a physical layer 122, link layer 124, and transaction layer 126. The physical layer 122 may include hardware components for implementing the hardware protocol necessary for receiving and sending data over the FSB 128. The physical layer 122 may exchange data with the link layer 124 which may format data received from or to be sent to the transaction layer 126.

As illustrated, the transaction layer 126 may exchange data with the processor cores 112 via a CPU bus interface 118. For some embodiments, data may be sent over the FSB as packets. Therefore, the link layer 124 may contain circuitry configured to encode into packets or "packetize" data received from the transaction layer 126 and to decode packets of data received from the physical layer 122, which may include a serializer 243 and a de-serializer 244 (shown in FIG. 2A) for generating and receiving such packets, respectively.

As shown in FIG. 2A, a plurality of virtual channels 220 may be established to exchange data between the processor cores 112 and external devices. Illustratively, the virtual channels include two (CPU controlled) virtual channels $220_1$ and $220_2$ on the transmit side (e.g., to transmit data from the CPU to the GPU) and two (GPU controlled) virtual channels $220_3$ and $220_4$ on the receive side (e.g., to receive data transmitted from the GPU to the CPU). The virtual channels 220 may improve overall system performance, for example, allowing one processing core to transfer data while another processes data (and is not transferring data).

As illustrated, the virtual channels may be used to transfer data into and out of a shared buffer pool 210. Each virtual channel may be allocated a different portion of the shared buffer pool. For example, the first transmit-side virtual channel $220_1$ may be allocated and utilize buffers 211 and 212 to hold request commands and data that will be sent in packets to an external device, while the second transmit-side virtual channel $220_2$ may be allocated and utilize buffers 213 and 214 to hold response commands and data to be sent the external device (e.g., in response to commands received therefrom). Similarly, the first receive-side virtual channel $220_3$ may be allocated and utilize buffer 215 to hold request commands and data received from the external device, while the second receive-side virtual channel $220_4$ may be allocated and utilize buffers 216 and 217 to hold response commands and data received from the external device.

For some embodiments, each data packet sent to the external device on a virtual channel may be assigned a sequence count. Each virtual channel may utilize a unique sequence, different from those used by other virtual channels. For some embodiments, the receiving device may periodically send a packet containing an indication of what sequence count it is expecting next. This packet may also serve to acknowledge the receipt of data packets by the external device. For example, the external device may send a packet indicating it is expecting a sequence count of N+1 that doubles as an acknowledgement it has successfully received a packet with a sequence count N.

Each transmitting device may have a data structure that is used to retain pertinent command information in case packet retries are required on its transmit virtual channels. For example, this data structure may retain (or buffer) a series of packets that have been sent. In the event any of these packets are not acknowledged in some predetermined period of time, that packet and all subsequent packets may be retried. As illustrated, for some embodiments, this data structure may be implemented using a circular buffer 222. The circular buffer 222 may provide a straightforward method for matching commands with their corresponding sequence count. A given command packet may always have the same index in the queue, and various pointers into the circular buffer will wrap around as they reach the top (hence the term circular). Similar data structures operating in a similar manner may also be utilized on the GPU side, to track data packets sent to the CPU over virtual channels $220_3$ and $220_4$.

Figure 2B:
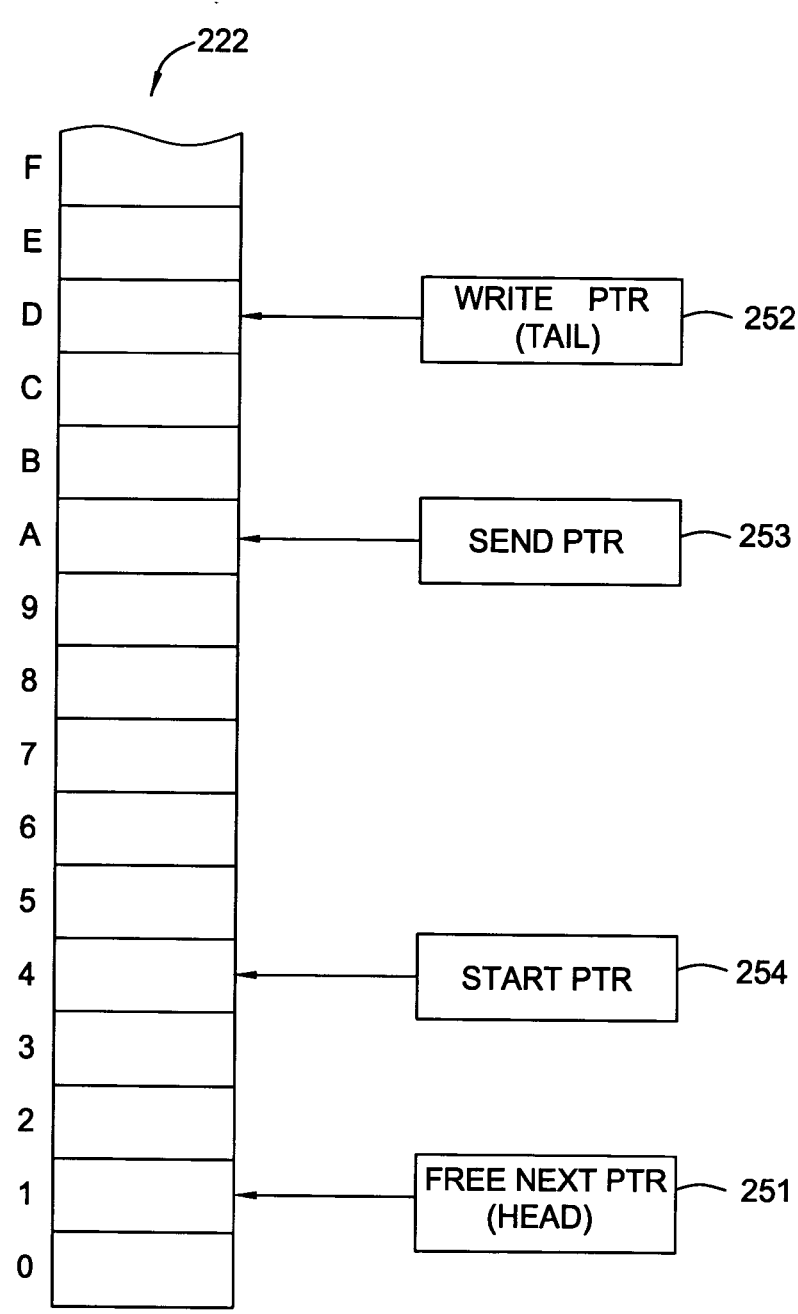
FIG. 2B illustrates an exemplary buffer used to track commands sent over a virtual channel, according to one embodiment of the present invention.

For each circular buffer 222, a set of pointers may be maintained that indicate important buffer entries. For example, as illustrated in FIG. 2B, these pointers may include pointers that indicate the earliest location in the queue containing a data packet that has not been freed (i.e., the earliest location/entry that is not ready to accept another entry) and the next position in the buffer that can be written into, referred to herein as a head pointer 251 and tail pointer 252, respectively. The pointers may also include a pointer that indicates the sequence count of the next packet to send (Send Pointer 253) and a pointer (start pointer 254) to the beginning of outstanding commands (commands that have been sent but not yet acknowledged). For some embodiments, these pointers may be used to determine which commands should be retried in the event a packet sent on a corresponding virtual channel is lost (not acknowledged).

Link Self-Healing

As previously described, occasionally the transmitting and receiving devices may get out of sync (e.g., due to an unexpected reset) such that the receiving device expects a packet with a sequence count that is different than the sequence count to be used by the transmitting device for subsequent packets. However, embodiments of the present invention may overcome this situation and avoid bus deadlock by adjusting the sequence count on the transmitting device to match the sequence count expected by the receiving device.

Figure 3:
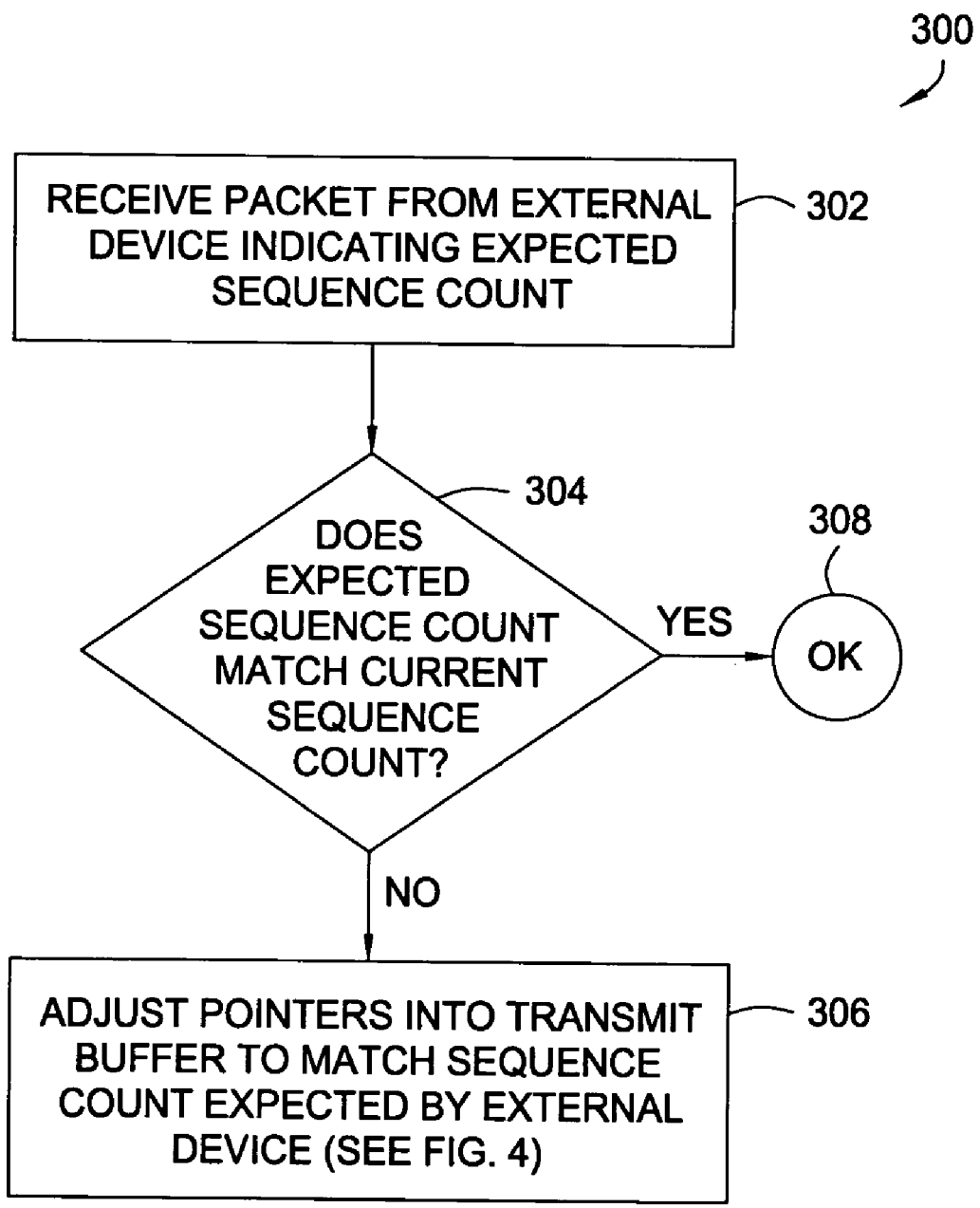
FIG. 3 is a general flow diagram of exemplary operations according to one embodiment of the present invention.

For example, referring back to FIG. 2A, the transmitting device may include self-healing sequence count adjust logic 230 that monitors synchronization packets received from the external device that indicate the sequence count expected by the receiving device and adjusts pointers into the circular buffer 222 accordingly to enable the transmitting device to begin transmitting packets with the sequence count expected by the receiving device. FIG. 3 illustrates exemplary operations 300 the logic 230 may perform in order to self-heal the link between the transmit and receiving devices and adjust the sequence count of transmitted packets.

The operations 300 begin, at step 302, by receiving a synchronization packet that indicates an expected sequence count of the receiving device. At step 304, the expected sequence count is compared against the current sequence count maintained at the transmitting device. If the current sequence count maintained by the transmitting device and the sequence count expected by the receiving device match, the devices are in sync, and the operations 300 may terminate, at step 308, without link self-healing. The expected sequence count could also be compared against the sequence counts of any outstanding packets (in addition to the current sequence count) and still be valid and not cause the chip to begin self-healing. In other words, there may be a range of sequence counts that could "match" the expected sequence count, as it may take some time to receive acknowledge packets.

In any case, If the sequence count expected by the receiving device does not match current sequence count maintained by the transmitting device (or the sequence count of an outstanding packet), the devices are not in sync. Therefore, at step 306, the self-healing logic 230 may adjust pointers into the transmit buffer (e.g., circular buffer 222) so the transmitting device may begin transmitting packets with sequence counts that match the sequence count expected by the receiving device.

Figure 4:
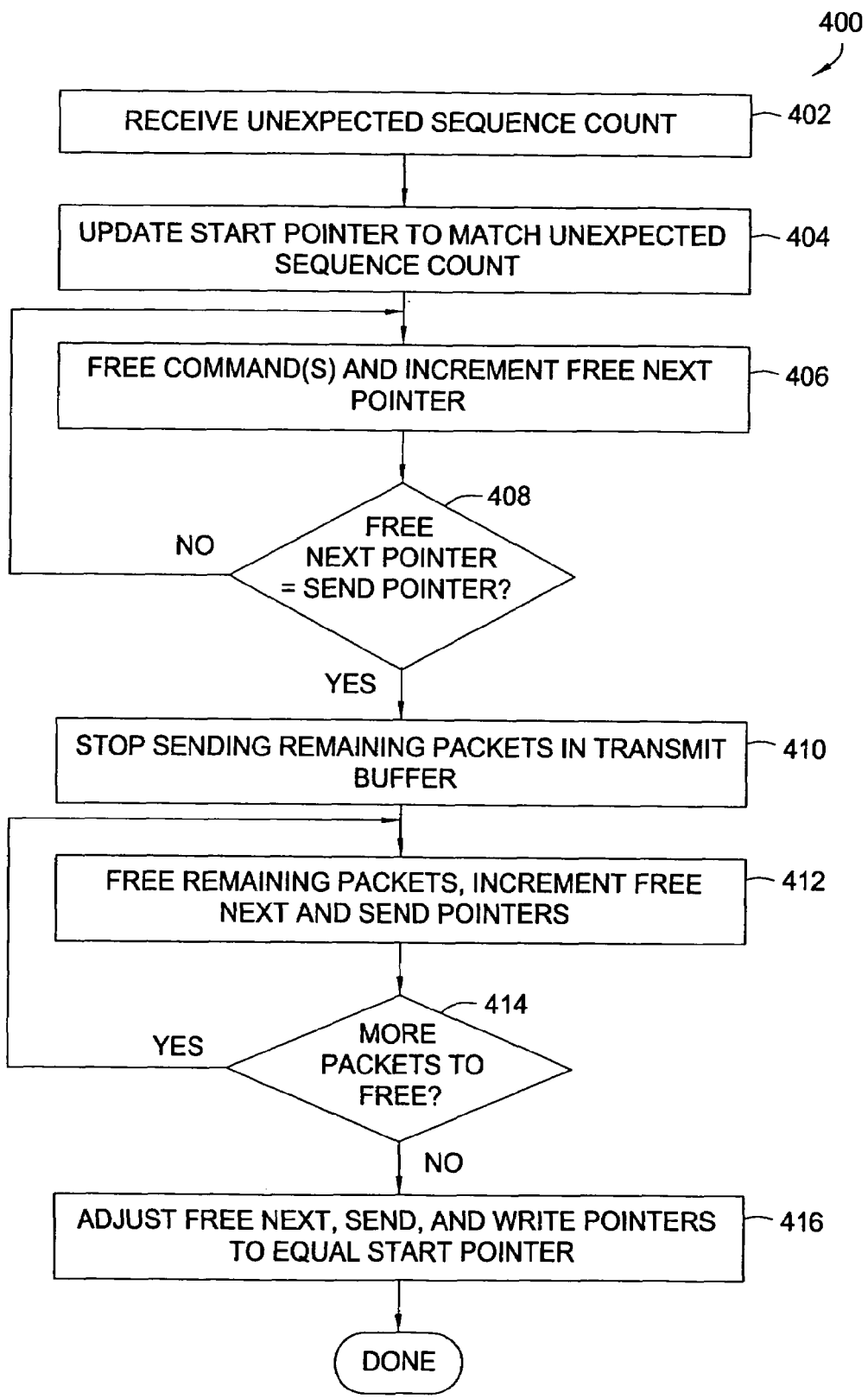
FIG. 4 is a more detailed flow diagram of exemplary operations according to one embodiment of the present invention.

FIG. 4 illustrates exemplary operations 400 that may be performed by the self-healing logic 230 to adjust pointers into the circular buffer 222 in order to self-heal the link and bring the transmitted sequence count in sync with the sequence count expected by the receiving device. The operations 400 may be explained with reference to FIGS. 5A-5D which illustrate the various pointers into the circular buffer 222 and how they may be adjusted at various points when performing the self-healing operations 400 shown in FIG. 4.

Figure 5A:
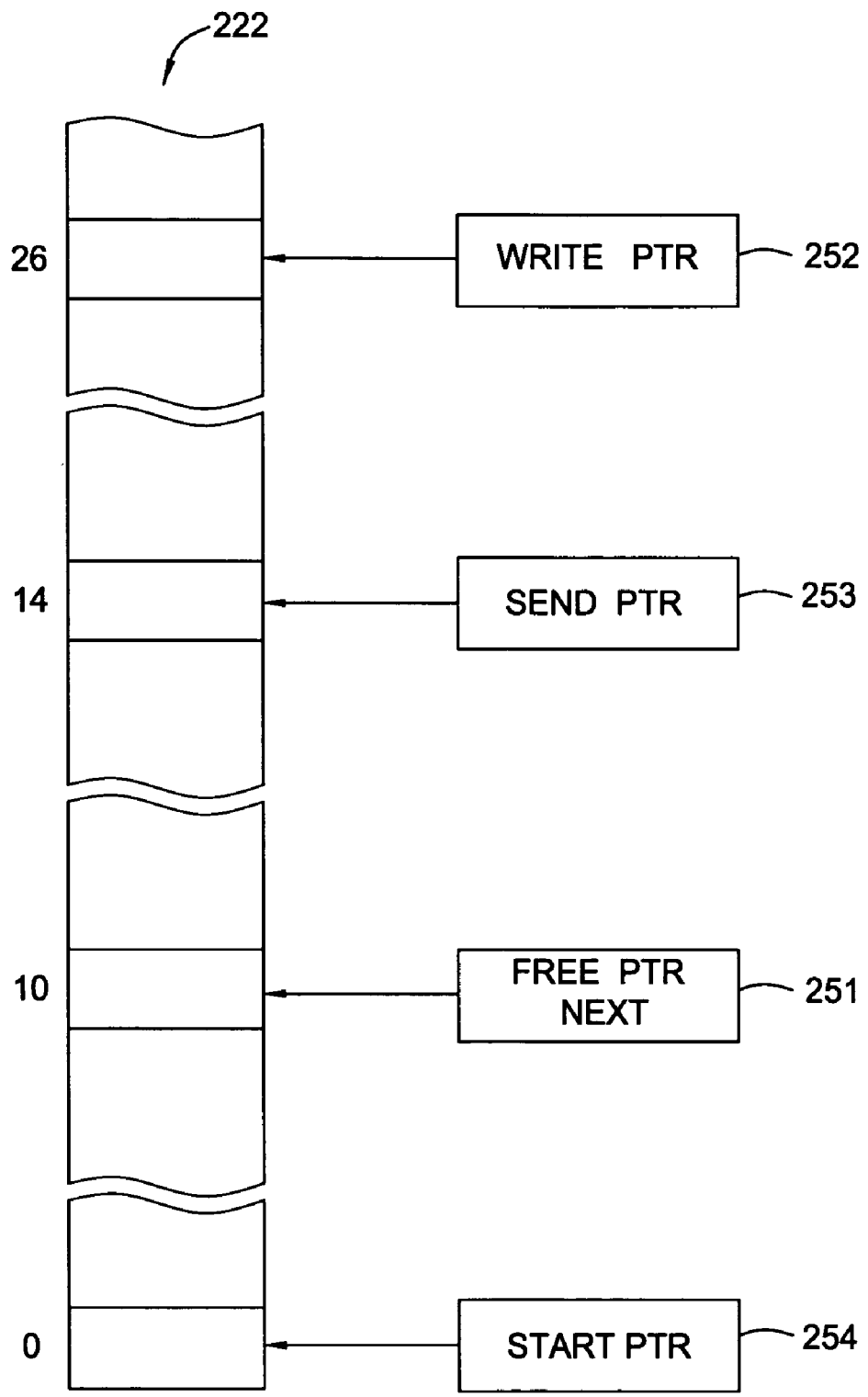
FIGS. 5A-5D illustrate an exemplary buffer with pointers adjusted according operations of FIG. 4.

The operations 400 begin, at step 402, by receiving an unexpected sequence count (e.g., an expected sequence count that does not match a current sequence count or the sequence count of an outstanding packet). At step 404, the Start pointer 254 (that indicates the earliest outstanding packet) into the circular buffer 222 may be updated to match the unexpected sequence count. Assuming the receiving device is reset and the expected sequence count is initiated to zero, the Start pointer may be set to zero, as shown in FIG. 5A.

As illustrated, this example also assumes that the FreeNext pointer 251 (indicating the earliest packet not freed) is at 10, the Send Pointer 253 (indicating the next packet to be sent) is at 14, while the Write Pointer 252 (indicating the next buffer entry to be written to) is at 26. In other words, the circular buffer 222 holds unsent packets with sequence counts from 14 to 25. Accordingly, with no self-healing, the transmitting device would attempt to send packets starting with sequence count 14, which would be ignored by the receiving device which is expecting a sequence count of zero. However, by performing the following operations, the self-healing logic 230 may allow the transmitting device to begin transmitting packets with the expected sequence count.

Figure 5B:
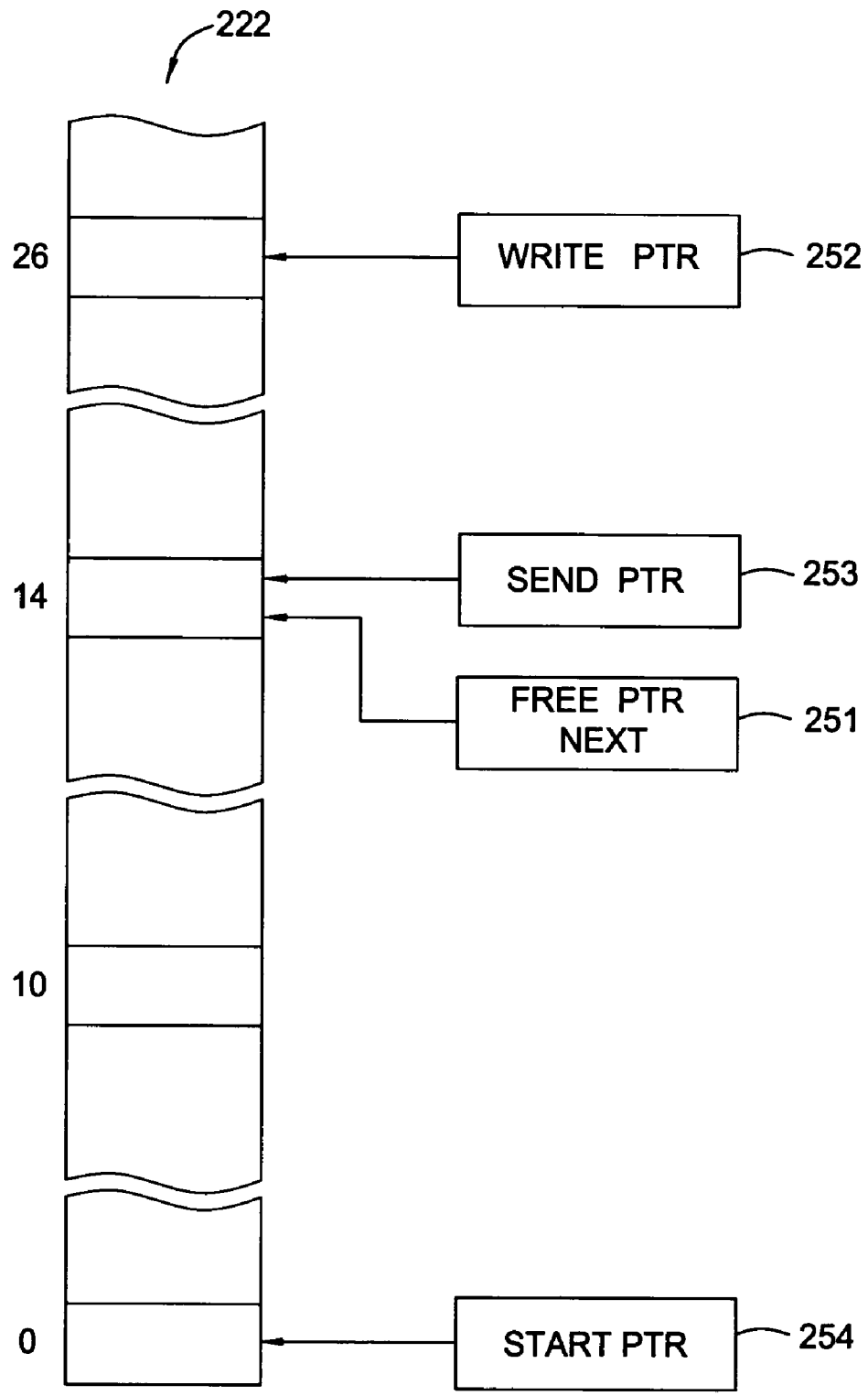

At step 406, the logic 230 may begin to free commands and increment the FreeNext pointer 251 until it matches the Send pointer 253, as determined at step 408. In other words, all commands that have been sent (whether acknowledged or not) are freed from the circular buffer. At this point, with the FreeNext and Send Pointers pointing to the same entry, as illustrated in FIG. 5B, the unexpected sequence count error may be evident, as any command freed after this has not been sent yet.

Figure 5C:
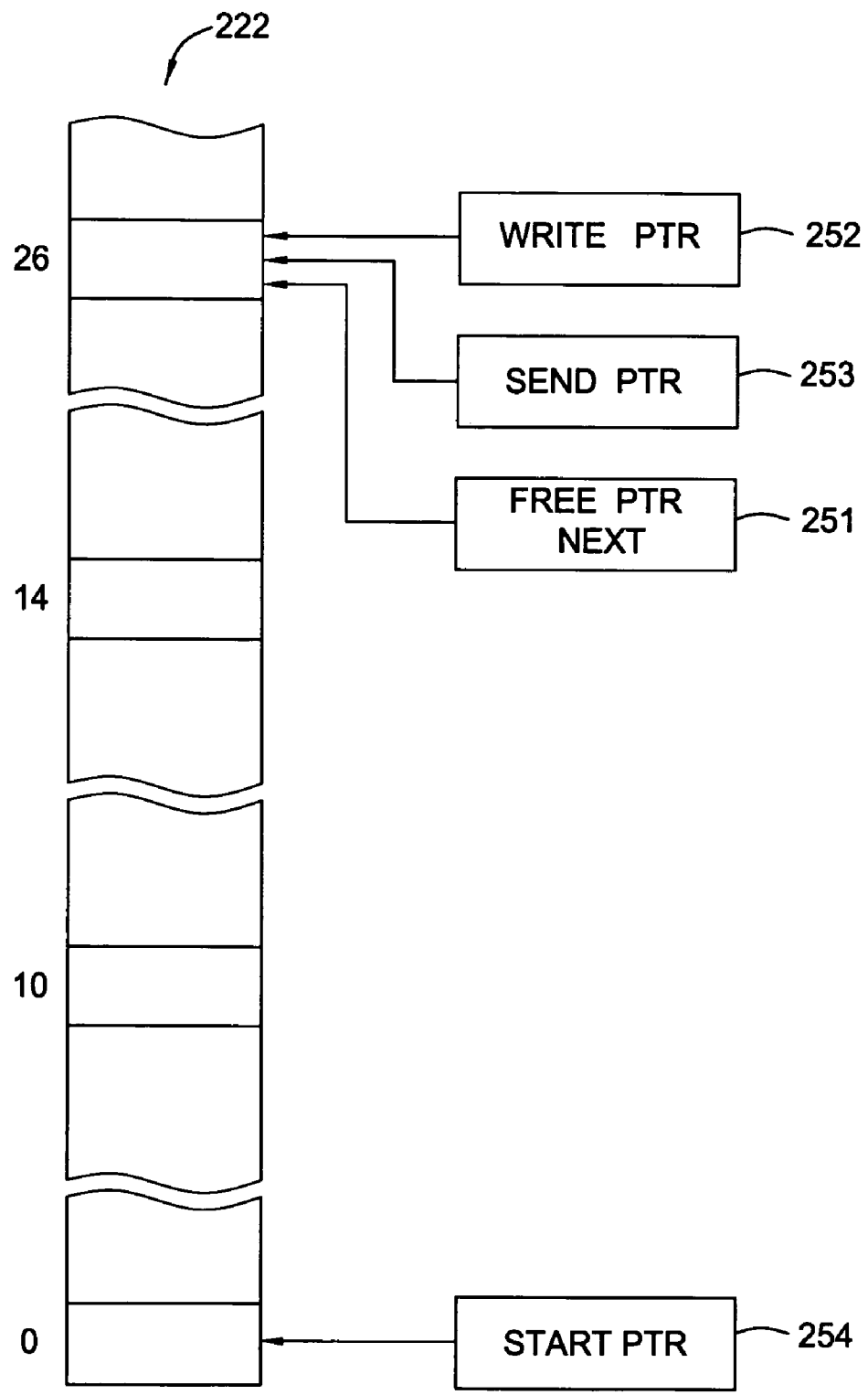

Accordingly, the transmitting device may stop sending the remaining packets in the transmit buffer, at step 410. However, in order to prepare the transmit buffer to begin transmitting packets with the expected sequence count (illustratively, zero), the remaining packets are freed and the FreeNext and Send pointers are incremented accordingly, at step 412. Once there are no more packets to free (e.g., packet 25 has been freed), as determined at step 414, the FreeNext, Send, and Write Pointers all point to the same buffer entry, as illustrated in FIG. 5C.

Figure 5D:
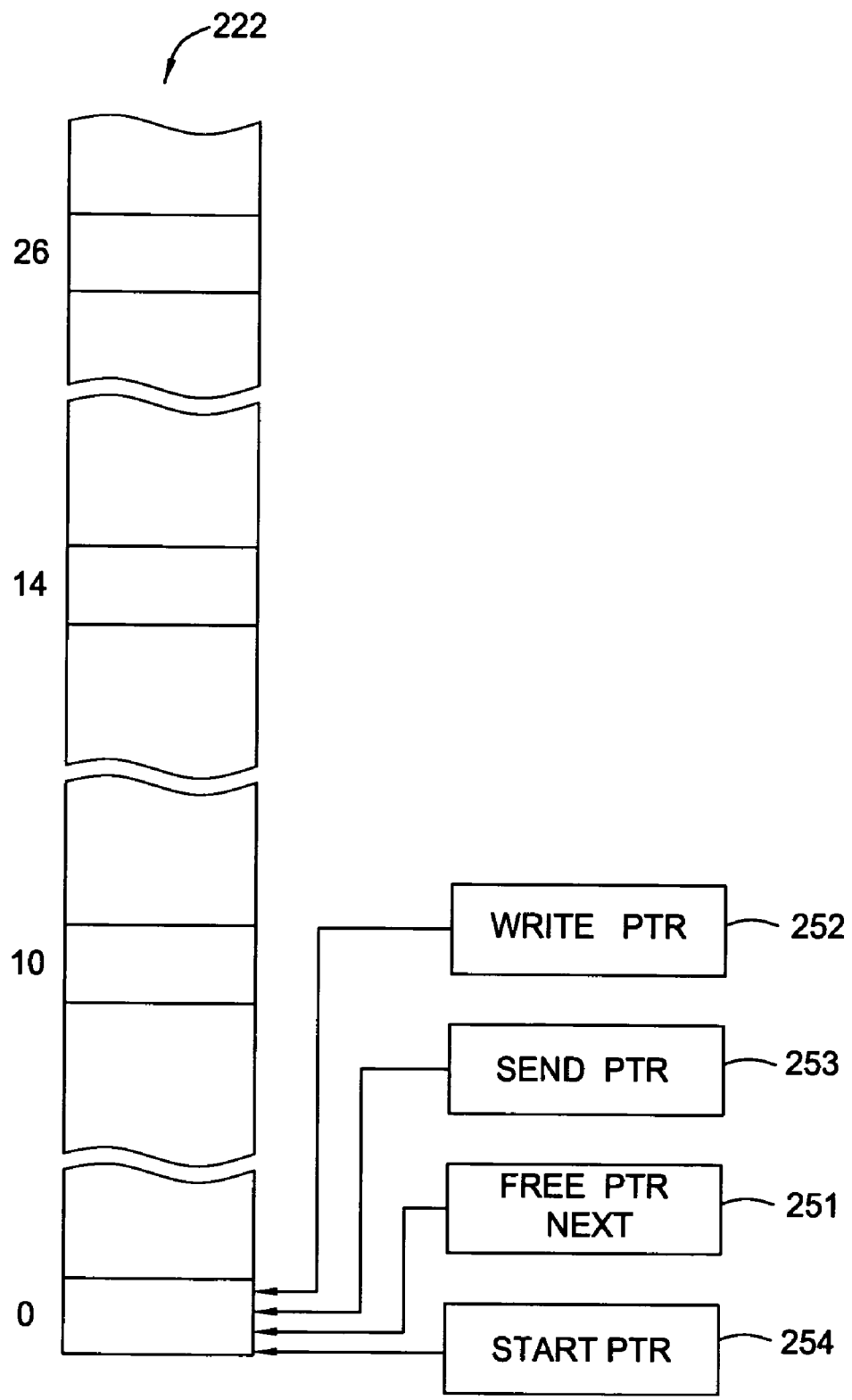

However, the transmit buffer pointers still need to reach the point where new packets will be sent with the expected sequence count (0), and thus be accepted by the opposite side of the link. Therefore, to continue this self-healing, at step 416, the logic 230 continues to increment the FreeNext, Send, and Write pointers until they all equal Start pointer, as illustrated in FIG. 5D (it is assumed for this example that, due to the circular nature of the buffer 222, that the pointers wrap around to zero). The self-healing logic 230 may operate in a similar manner to that described above for the case where the Start pointer is beyond Send pointer, but before Write pointer. In other words, the logic 230 may free commands until both the Free Next and Send pointers reach Start pointer, while Write pointer may remain unchanged.

As described above, these self-healing operations may, at times, result in lost packets, since some packets that have not been sent are freed and therefore never transmitted. In some cases, the loss of these packets may be detected and accounted for, for example, in software, allowing data integrity to be maintained. While this may result in some amount of overhead, this is likely preferable to the alternative of losing all commands and the link becoming deadlocked. In other words, the self-healing operations described herein provide a method of recovery when an unexpected event has happened within the system, causing abnormal values to be expected on the receive side of the link.

Figure 6:
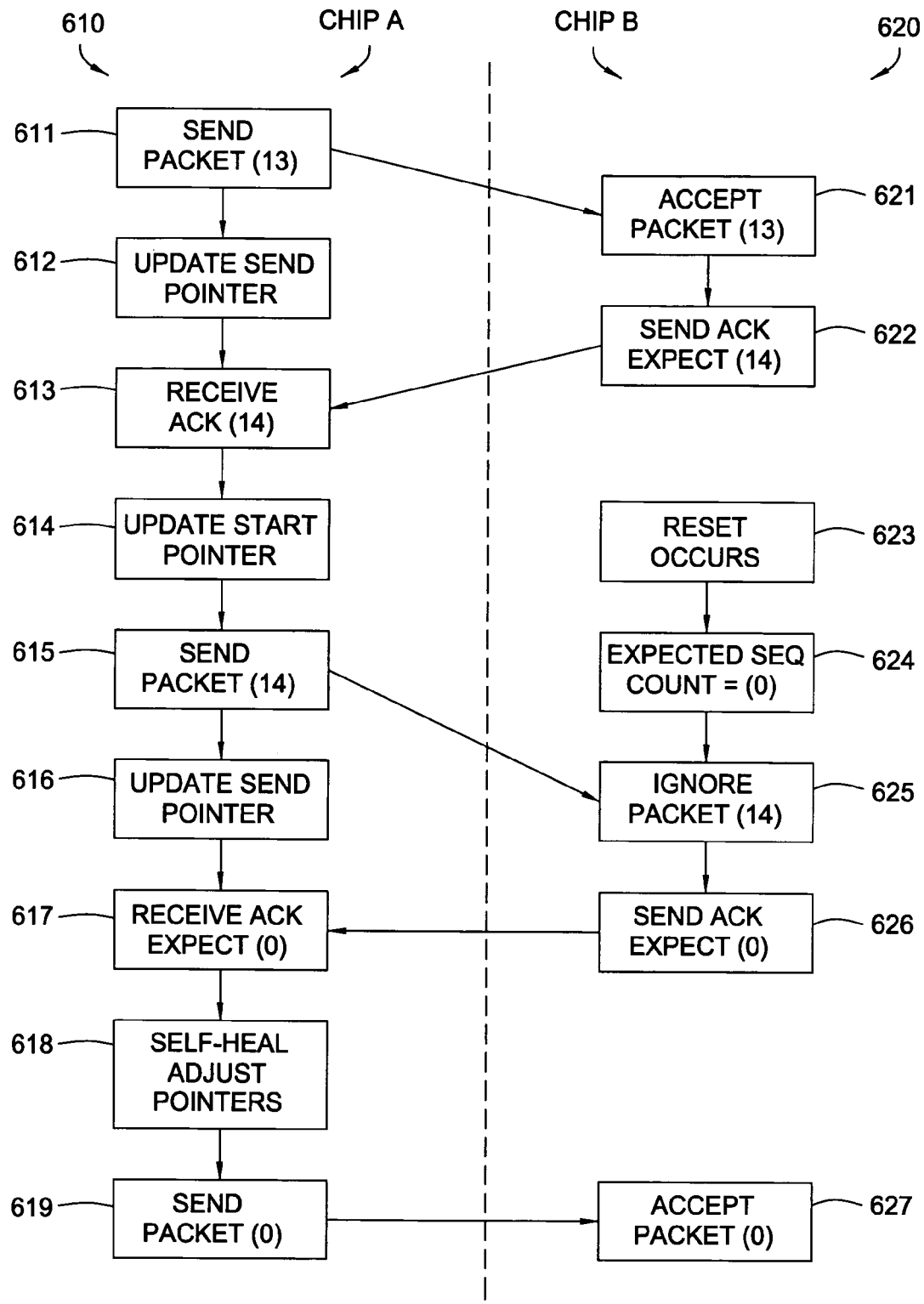
FIG. 6 illustrates an exemplary sequence of bus transactions with link self-healing, in accordance with embodiments of the present invention.

The value of self healing may be illustrated by considering the exemplary exchange of data packets shown in FIG. 6, with transmitting device (Chip A) and receiving device (Chip B) performing operations 610 and 620, respectively. At step 611, Chip A sends packet with a sequence count of 13 (packet 13), and updates the Send Pointer, at step 612. At step 621, Chip B receives and accepts packet 13, and sends an acknowledge packet indicated it next expects a sequence count of 14, at step 622. At step 613, Chip A receives this acknowledge packet and, as it matches its current sequence count, merely updates the Start pointer, at step 614.

However, at step 623, an unexpected reset occurs on Chip B, causing the expected sequence count to be reset, at step 624. As a result, when Chip A sends a packet with a sequence count of 14, at step 615 (and updates the Send pointer at step 616), because its expected sequence count is zero, Chip B ignores this packet, at step 625. At step 626, Chip B sends a packet indicating it expects the next packet it receives to have a sequence count of 0, which is received by Chip A, at step 617.

Because this expected sequence count (0) does not match the current sequence count (14), in order to avoid a bus deadlock condition, Chip A performs self-healing operations, adjusting the pointers into the transmit buffer (e.g., as described above), at step 618. After these self-healing operations, Chip A may resume transmission, by sending a packet with the sequence count expected by Chip B, at step 619. This packet is accepted by Chip B, at step 627.

CONCLUSION

By performing self-healing operations, current sequence counts on a transmitting device may be adjusted to match the expected sequence count of a receiving device. As a result, the transmitting and receiving devices may recover from unexpected events (e.g., a device reset) and avoid bus deadlocks.

While the foregoing is directed to embodiments of the present invention, other and further embodiments of the invention may be devised without departing from the basic scope thereof, and the scope thereof is determined by the claims that follow.

What is claimed is:

1. A method of communicating with an external device over a bus utilizing one or more virtual channels, at least one of the virtual channels utilizing a transmit buffer to hold commands and data to be sent in packets to the external device, comprising:
   maintaining a current sequence count for packets to be transmitted to the external device;
   receiving a packet from the external device indicating an expected sequence count that does not match the current sequence count; and
   adjusting the current sequence count to match the expected sequence count by modifying one or more pointers into the transmit buffer, wherein the adjusting comprises:
      setting a first pointer indicating an earliest packet in the transmit buffer that has been sent, but not acknowledged, to the same value as the expected sequence count;
      adjusting a second pointer indicative of a location in the transmit buffer containing an earliest packet that has been transmitted but not yet cleared from the transmit buffer;
      once the second pointer has reached a third pointer indicative of a next packet to be sent, adjusting the second and third pointers together;
      once the second and third pointers have reached a fourth pointer indicative of the next entry in the transmit buffer to be written to, adjusting the second, third and fourth pointers to match the first pointer; and
      subsequently, transmitting a packet having the expected sequence count to the external device.

2. The method of claim 1, wherein receiving a packet from the external device indicating an expected sequence count that does not match the current sequence count comprises receiving a periodically transmitted acknowledgement packet.

3. The method of claim 1, wherein the expected sequence count does also not match the sequence count of one or more previously sent and unacknowledged packets.

4. The method of claim 1, wherein maintaining a current sequence count comprises incrementing a pointer into the transmit buffer upon sending a packet to the external device.

* * * * *